July 24, 1923.

J. DEGENDORFER

AGRICULTURAL FORK

Filed Dec. 19, 1921

1,462,787

INVENTOR.
J. Degendorfer
BY
ATTORNEY

Patented July 24, 1923.

1,462,787

UNITED STATES PATENT OFFICE.

JOHN DEGENDORFER, OF SAN FRANCISCO, CALIFORNIA.

AGRICULTURAL FORK.

Application filed December 19, 1921. Serial No. 523,565.

*To all whom it may concern:*

Be it known that I, JOHN DEGENDORFER, a citizen of the United States, residing at San Francisco, county of San Francisco, State of California, have invented certain new and useful Improvements in Agricultural Forks; and I do declare the following to be a full, clear, and exact description of the same, reference being had to the accompanying drawings, and to the characters of reference marked thereon, which form a part of this application.

This invention relates to improvements in agricultural implements, and particularly to forks or grapples operated in conjunction with derrick and rope winding means, and used to load and stack hay, straw, sugar cane and the like.

The principal object of my invention is to provide a fork structure by means of which loading and unloading operations may be carried out entirely by the derrick operator, without the necessity of an additional laborer being used to manipulate the fork and lock the same, as must be done with the common run of forks used.

A further object of my invention is to provide a fork structure which needs no locking means of any kind, either hand operated or otherwise, and in which the heavier the load, the more firmly will it be held while the fork is being raised.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1:
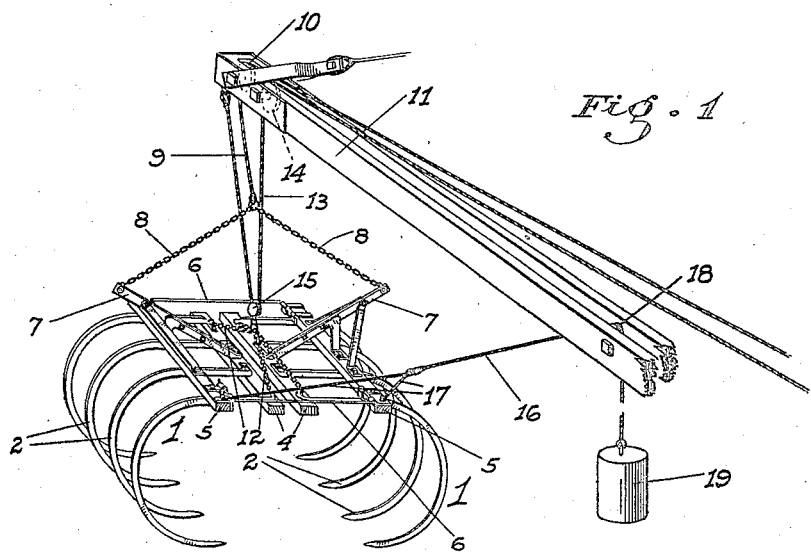
Fig. 1 is a perspective view of the fork showing the same in connection with a hoisting-derrick boom.

Referring now more particularly to the characters of reference on the drawings, the numeral 1 denotes a pair of co-operating fork members, each unit comprising a plurality of hook shaped tine members 2, which are curved so as to be substantially semi-circular from their pointed ends, and terminating in tangentially disposed straight portions 3 at the other ends. Each set of tines is rigidly connected together so as to lie in a common transverse plane by means of cross bars 4 and 5, extending across the portions 3, the former bar being preferably under the tines and at the outer end thereof, while the bar 5 is preferably above the tines and set back some distance from but parallel to the bar 4, and projects beyond said bar 4 at both ends.

The tine units thus formed are disposed with their curved portions concave with respect to each other, and are permanently coupled together in this position by means of connecting rods 6, flexibly connected to the bars 5 at the outer ends thereof, so as to allow the bars 4 to pass therebetween when necessary.

The connections of the rods with the fork units therefore form the axes about which the units may be moved with respect to each other, to open or close the same.

Rigidly fixed to the bars 4 and extending at an acute angle with the respective tine portions 3 and in opposite directions from each other are arms 7.

The outer ends of these arms are above the vertical planes of the said axes, and are normally beyond the same, having connected thereto branch chains or cables 8 which connect with a common operating cable 9 passing upwardly over a sheave 10 on a derrick boom 11 and thence to a suitable winding drum of ordinary character (not shown).

Similar branch chains or cables 12 are fastened to the ends of the bars 4 and connect with a common hoisting cable 13, likewise passing over a sheave 14 on the boom 11 to another winding drum. The cable 13 preferably passes through a block 15 to which the chains 12 are directly connected, while one end of the cable is fastened to the boom, making the raising of a load an easier task than with a straight line of cable, owing to the application of the well known block and tackle principle.

To prevent the fork structure from swinging, a cable 16, provided with branches 17 connected to the adjacent ends of the bars 5, extends upwardly at an angle to the cables 9 or 13, and passes over a sheave 18 on the boom, with a weight 19 on its end beyond said sheave, to counterbalance the weight of the fork structure.

In operation, to gather, raise and dump a load, presuming that the fork is now in the air, the cable 13 is allowed to become slack, while the fork is supported and lowered by manipulation of the cable 9.

Figure 2:
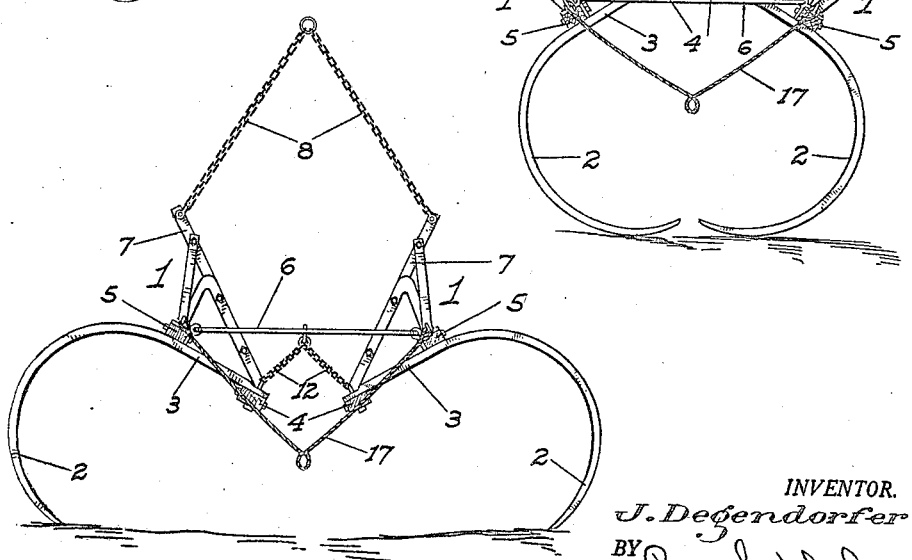
Fig. 2 is a side view of the fork, as fully opened to load.

This causes the outer ends of the arms 7, to which said cable is connected, to be drawn toward each other, while the forks open out, as shown in Fig. 2, the forks turning about their connections with the rods 6 as axes, as previously stated.

The pointed or outer ends of the forks are therefore spread widely apart, ready to grab a load when the device is raised.

This is done by allowing the cable 9 to be slack, while the cable 13 is pulled on. This causes the bars 4 to be first raised and drawn toward each other, causing the pointed ends of the forks to move together grasping and including therebetween a certain amount of the naturally somewhat loose hay or cane onto which the fork has previously been lowered.

Figure 3:
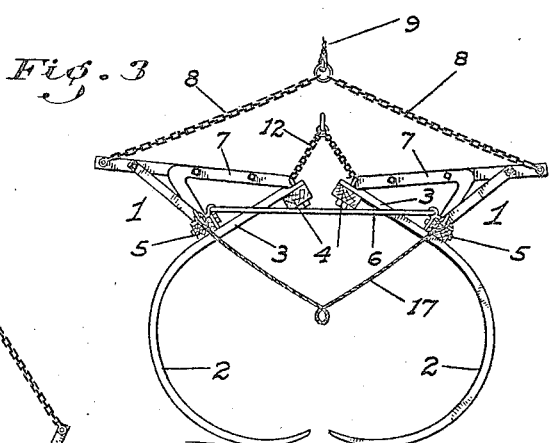
Fig. 3 is a similar view of the fork in closed position.

If the raising of the cable 13 is then continued, the device will be raised as a whole, the pointed ends of the forks coming even closer together as shown in Fig. 3, until the load held thereby is firmly grasped in the enclosure formed between the forks and it will be evident that until the cable 12 is definitely slackened and the cable 9 pulled on or prevented from unwinding, the load cannot escape.

As long as the cable 13 is held taut, the fork may be raised and lowered as much as desired without fear of unintentional dumping, while this latter operation may be accomplished in an instant at the proper time and at the will of the operator.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An agricultural fork comprising a pair of opposed and co-operating jaw members, means holding said members in spaced relation while connecting them in a manner to permit of their swinging relative to each other for open and closing movement, and cable means connected to said members for imparting such movement thereto.

2. An agricultural fork structure comprising a pair of co-operating tine units, connecting rods pivoted to the tine units a predetermined distance from their upper ends, vertical cable means connected to said units at said ends, and independent vertical cable means connected to the tine units at points above and normally beyond the pivotal connections of the rods therewith.

3. An agricultural fork structure comprising a pair of co-operating tine units, connecting rods pivoted to the tine units a predetermined distance from their upper ends, vertical cable means connected to said units at said ends, arms projecting in opposite directions and rigidly connected to the respective units at their upper ends and vertical cable means connected in common to the outer ends of said arms.

4. An agricultural fork structure comprising a pair of co-operating tine units, connecting rods pivoted to the tine units a predetermined distance from their upper ends, vertical cable means connected to said units at said ends, arms projecting in opposite directions and rigidly connected to the respective units at their upper ends, the outer ends of said arms being above and normally beyond the pivotal connection of the rods with the respective units, and means connected in common to the outer ends of both arms whereby to raise and draw the same together and cause the forks to open apart about the said spaced pivotal connections as axes.

5. An agricultural fork comprising a pair of tine units each consisting of a plurality of spaced tines oppositely curved with respect to those of the outer unit, cross bars coupling the tines of each unit, one of said bars of each unit being at the upper end of the tines, connecting rods coupling the units together and pivoted thereto beyond the end cross-bars, a common flexible raising means attached to the adjacent cross bars, arms rigidly fixed to said bars and projecting away from each other, and a common flexible raising means attached to the outer ends of said arms.

In testimony whereof I affix my signature.

JOHN DEGENDORFER.